United States Patent [19]

Wood et al.

[11] Patent Number: 4,941,456

[45] Date of Patent: Jul. 17, 1990

[54] PORTABLE COLOR IMAGER BORESCOPE

[75] Inventors: Robert J. Wood; Earl H. Slee, both of Syracuse; Gregory E. Pasik, Auburn; Michael J. Pileski, Warners, all of N.Y.

[73] Assignee: Welch Allyn, Inc., Skaneateles Falls, N.Y.

[21] Appl. No.: 417,553

[22] Filed: Oct. 5, 1989

[51] Int. Cl.5 .............................. A61B 1/06; G02B 7/00
[52] U.S. Cl. ........................................ 128/6; 356/241; 358/98
[58] Field of Search ...................... 128/4, 6; 356/241; 358/98

[56] References Cited

U.S. PATENT DOCUMENTS

| | | | |
|---|---|---|---|
| 4,253,447 | 3/1981 | Moore et al. | 128/6 |
| 4,261,344 | 4/1981 | Moore et al. | 128/6 |
| 4,294,233 | 10/1981 | Takahashi | 128/4 |
| 4,491,865 | 1/1985 | Danna et al. | 128/4 X |
| 4,559,928 | 12/1985 | Takayama | 128/6 |
| 4,621,618 | 11/1986 | Omagari | 128/6 |
| 4,659,195 | 4/1987 | D'Amelio et al. | 128/4 X |
| 4,688,555 | 8/1987 | Wardle | 128/4 |
| 4,787,369 | 11/1988 | Allred et al. | 128/4 |
| 4,823,244 | 4/1989 | Alaybayoglu et al. | 128/6 X |

Primary Examiner—William H. Grieb
Attorney, Agent, or Firm—Wall and Roehrig

[57] ABSTRACT

A portable steerable borescope has a cable bendable steering section adjacent the viewing head, a servo control mechanism for the actuation cables of the bendable steering section, a joystick for actuating the steering section which is located remotely from the insertion tube and a control module/battery pack containing all the operating functions except for the video display which is a standard JVC portable color video monitor, all of which cooperate to yield a compact and portable industrial video borescope that can be used in remote locations as well as in conventional commercial power environments. Special circuitry has been provided to limit power consumption allowing over one hour remote operation without external power or large, heavy cumbersome batteries.

16 Claims, 6 Drawing Sheets

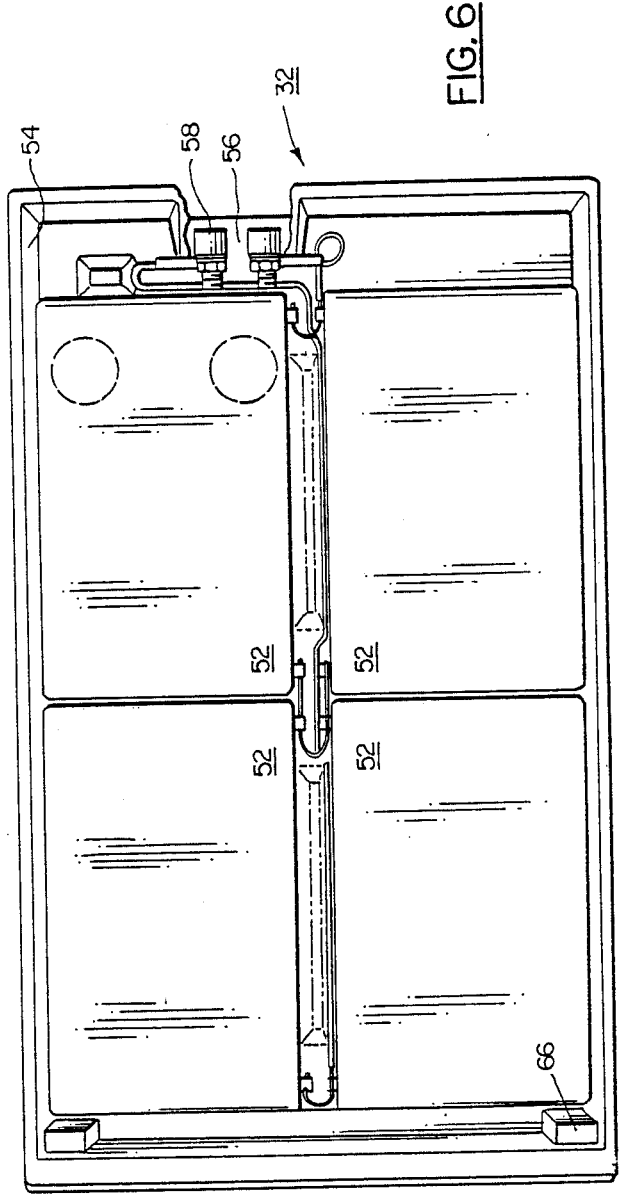
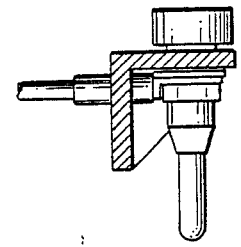
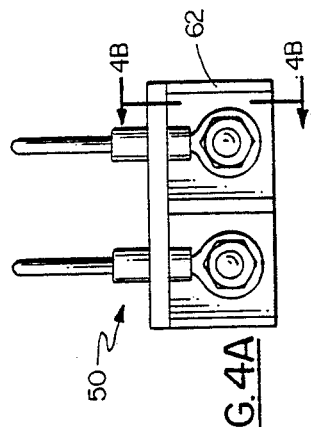

PORTABLE COLOR IMAGER BORESCOPE

BACKGROUND OF THE INVENTION

This invention relates generally to a borescope or endoscope for providing full color video images of inaccessible objects of the type having a cable actuated hollow steering section, and more particularly, to a compact portable battery operated borescope system.

A borescope is generally characterized as an elongated flexible insertion tube with a viewing head at its distal end and a control and processing section at its proximal end. Various devices have been provided in the prior art for realizing a full color video picture of a target situated within a remote cavity. These devices have been gradually improved over time to where today, most devices of this type employ an external light source conveyed to the image viewing head by fiber optic bundles, together with a solid state image sensor and lens system positioned in the distal end of the insertion tube of the borescope connected to an external video processing system and standard television format display equipment.

Endoscope/borescope systems of this general type have been disclosed in various patents owned by a common assignee of the present applicant, such as U.S. Pat. No. 4,253,447 to Moore et al. U.S. Pat. No. 4,261,344 to Moore et al. U.S. Pat. No. 4,491,865 to Dana et al., to mention a few. The disclosure of U.S. Pat. No. 4,491,865 is hereby incorporated by reference as background in understanding the present invention. Another early endoscope system is shown in U.S. Pat. No. 4,621,618, to Omargi, which describes a central control/display station, separate light system, and a drive body for the insertable endoscope portion. The central control has a joystick actuated motor drive circuit for the wire controlled bendable section of the insertion tube. This rather large cumbersome system requires a paramedic to handle the endoscope while the doctor operates the device from the control station. Also, the apparatus obviously is not portable.

Applicant, on the other hand, has provided a compact automatic system that can easily be operated and controlled by one person. The major functions of illumination of the object, video image pick-up, video processing, and video display are automatically accomplished. The bendable section of the insertion tube is actuated by movement of a small joystick control electrically connected to a servo motor, allowing the joystick control to be selectively located at any convenient point with respect to the rest of the apparatus or the object being viewed. As applications for systems of this type have expanded from purely medical applications to wide ranging industrial applications, the need for portable compact systems that can be easily transported to remote locations and operated without immediate access to commercial power has required extensive changes and modifications to the earlier types of systems, and resulted in a number of significant improvements in capabilities from both the physical size and the electronic processing viewpoints.

For instance, inspecting jet engines has become increasingly important. Specialized borescopes having extreme flexibility and portability have been required to allow use on open flight lines where power is not readily accessible and for accessing difficult remote portions of an engine necessitating very accurate and careful manipulation of the viewing head of the insertion tube. These requirements have placed stringent demands on the articulation systems of borescopes as well as on the packaging and power consumption of the lighting, control, and electronic processing portions of the systems. At the same time, requirements for improved capability have increased and it has become necessary to provide greater illumination capabilities to permit resolution of smaller and smaller defects at greater and greater distances from the viewing head.

OBJECTS AND SUMMARY OF THE INVENTION

All of the foregoing have resulted in a requirement for the apparatus of the present invention in which it is an object to provide a highly compact portable borescope/endoscope of significantly improved color image resolving capabilities without the drawbacks of the prior art power, size and adaptability limitations.

It is another object of the present invention to provide an improved insertion tube articulation system for manipulating the insertion tube in confined precise cavities, which protects both the device and the cavity from damage or injury due to actuation of the articulation system by the operator.

It is a further object of the present invention to provide a greatly simplified control system for the light source for illuminating the object being viewed so as to minimize power required to illuminate the object and thus provide a greater useful battery life span.

It is yet a further object of the present invention to provide a borescope/endoscope system that can be operated for an hour or more on a self-contained battery pack of very compact size and weight.

It is another object of the present invention to utilize a full color, solid state image sensor with advanced processing capabilities to permit reductions in the size and weight of the control module of a borescope/endoscope system.

It is still another object of the present invention to provide a borescope/endoscope system that can be operated on interchangeable battery packs and/or other standard, readily available, battery power sources such as truck and car batteries.

It is another object of the present invention to provide an automatic feedback loop from the image sensor via the video processor to the light control system for optimizing the available light at the object being viewed for maximum resolution and sensitivity at the video image pick-up and display.

It is another object of the present invention to provide a borescope/endoscope color video imager apparatus having a versatile power supply system including a rechargeable battery pack as well as commercial power, together with the capability for recharging the battery pack whenever the system is not in use for viewing an object.

In one preferred embodiment of the present invention, the insertion tube articulation section has at least one pair of steering cables controlled by an automatic servo motor system, a pulse illuminating light source controlled by the requirements of the video image sensor so as to provide only the amount of light actually needed to properly view the object, and a full color solid state image sensor permitting use of white light instead of sequential red-green-blue illumination together with improved compact battery packs to permit remote operation of the system. All of the foregoing are packaged in two small packages, one a standard off-the-shelf, portable television color monitor, and the other a control module/battery pack, together with the insertion tube, and a remote articulation control for the bendable section of the insertion tube.

BRIEF DESCRIPTION OF THE DRAWINGS

The above and many other objects, features and advantages of this invention will be more fully understood from the ensuing detailed description of the preferred embodiment of the invention, which description should be read in conjunction with the accompanying drawings wherein:

FIGS. 4a and 4b are enlarged scale detail views of the floating banana plug connector for the battery pack;

FIG. 6 is an internal top plan view of the battery pack of the present invention;

DETAILED DESCRIPTION OF THE PREFERRED EMBODIMENT

Figure 1:
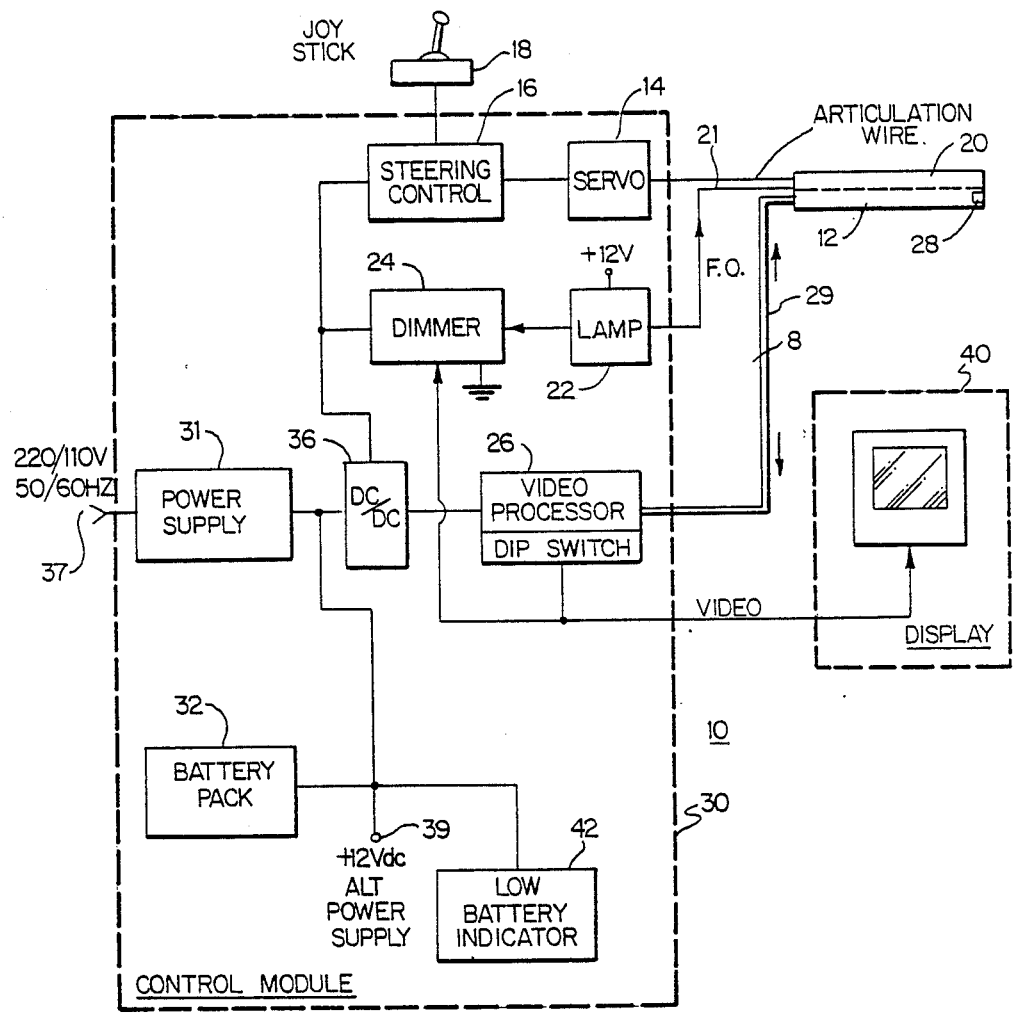
FIG. 1 is a block diagram of the apparatus of the present invention.
Figure 7:
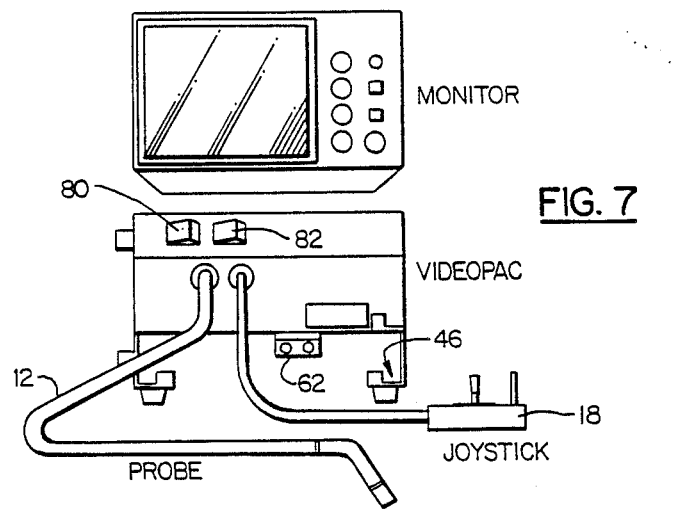
FIG. 7 is a front diagrammatic view of the borescope system of the present invention.
Figure 8:
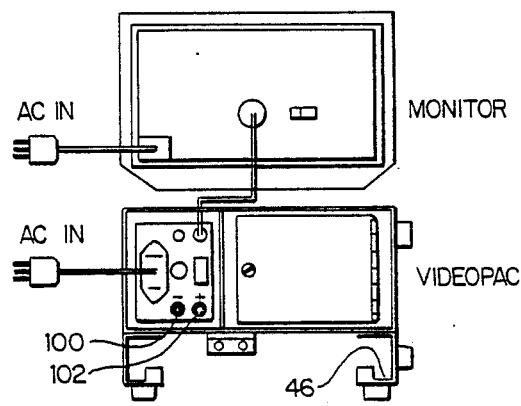
FIG. 8 is a rear diagrammatic elevation of the borescope of FIG. 7.

Referring now to FIGS. 1, 7 and 8 there is shown a highly compact, portable video image borescope system 10 which consists of an insertion tube, shown diagrammatically at 12, a servo actuated articulation system 14 for the flexible insertion tube section, a steering control unit 16 which is manipulated by a joystick 18. Joystick 18 is spring biased to a neutral position to develop a signal proportioned to its displacement therefrom which is fed to the steering control 16. The viewing head 20 of the insertion tube 10 is fed illuminating light by a fiber optic bundle 21 from the lamp 22 which is controlled by the lamp dimmer circuit 24 in accordance with a feedback signal from the video processing unit 26. The video processing unit 26 is also connected to the image sensor 28 at the viewing head by a multiple wire cable 29, including a special video coaxial cable channel. The image sensor 28 includes a CCD chip and lens assembly not shown. In one embodiment, the chip is a 248,000 pixel CCD full color chip. This is to be contrasted with prior art devices known to applicants in which chips with less than 100,000 pixels, typically 30,000 pixels are provided. All of these components, with the exception of the joystick and the insertion tube are located in a control module 30, shown in dotted lines, which also includes a power supply 31, a battery pack 32 and a DC-to-DC converter module 36. The basic operating power for the entire system can be supplied from a standard one-hundred-ten/two-hundred-twenty volt, fifty-sixty hertz power source 37, from the battery pack 32, or from an external twelve volt dc source 39. The power supply also includes a low battery indicator circuit 42 which includes a small, red LED light to indicate five to ten minutes of battery voltage power remaining for proper operation of the system.

The system is completed by the connection of a standard off-the-shelf five inch diagonal diameter JVC color television monitor 40 which receives the video output from the video processor 26 to display the images illuminated at the end of the viewing head 20 of the insertion tube 12. Monitor 40 is self-contained with its own power supply, including a battery pack (not shown) for remote independent operation.

Figure 2:
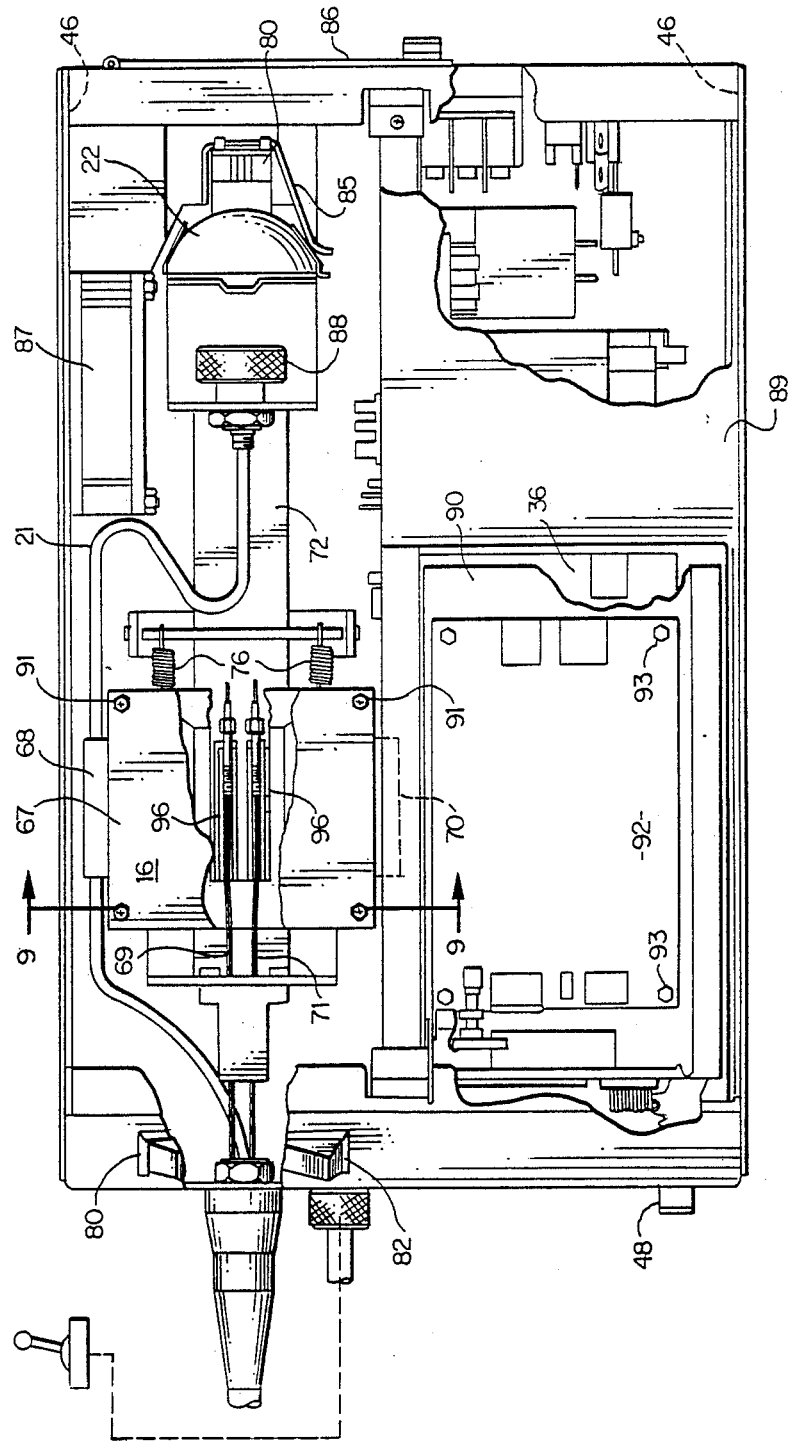
FIG. 2 is a top plan view partially broken away of the control module/battery pack of the present invention.
Figure 3:
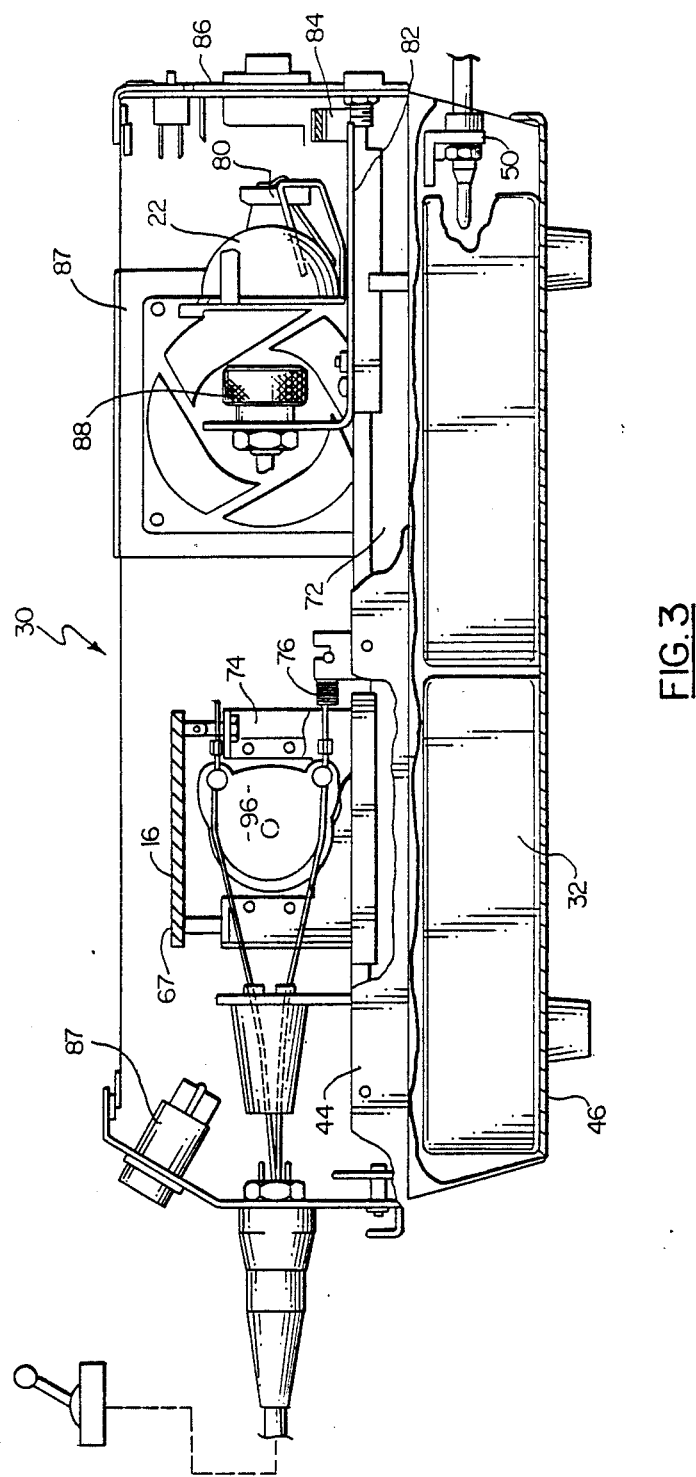
FIG. 3 is a side elevation and partial sectional view of the control module of FIG. 2, partially broken away to show various features of the compact arrangement and taken generally along the center divider thereof.

Referring now to FIGS. 2 and 3, the control module 30 has a main frame or chassis portion 44 in which are mounted the various components of the control system, including a pair of channels 46 on the bottom of the module as viewed in FIG. 2, to receive the battery pack 32 which slides into the channels and is engaged by latch 48 to hold the battery pack in solid mechanical position within the module and in good electrical contact with the floating banana plugs 50. The entire processing system is powered through plugs 50 when on battery power.

The battery pack (FIG. 6) consists of four lead-acid storage batteries 52 of the gelled electrolite type, which are connected in series parallel to provide the twelve volt output required. The batteries 52 are encapsulated in a plastic enclosure 54 which has mounted in a recess 56 therein the female banana plug receptacle 58. The male section 60 of the banana plug is mounted in a special floating fashion in bracket 62, (FIG. 4) fixed on the chassis 44. The latch 48 is mounted on one channel 46 to engage recess 66 (FIG. 6) to hold the battery in place. A series of battery packs of this type may be interchangeably mounted within the channels for powering of the processor unit.

The battery pack 32 may be charged through the power supply 31 when the control module is connected to a source of AC power 37. To accomplish this, the ON-OFF switch 80 must be in the "ON" position and the CHARGE-LAMP switch 82 must be in the "CHARGE" position.

The power supply is configured to work from 110/220 volts 50/60 hertz commercial power, and can charge up to three battery packs 32 and two monitor battery packs simultaneously. In addition to charging a battery pack mounted in the control module, banana plug terminated cables (not shown) allow the charging of the extra battery packs through the external power connectors 100 and 102 (FIG. 8). These female banana plugs 100 and 102 also serve as the connection to an external twelve volt power source schematically shown at 39 in FIG. 1 when needed.

Figure 9:
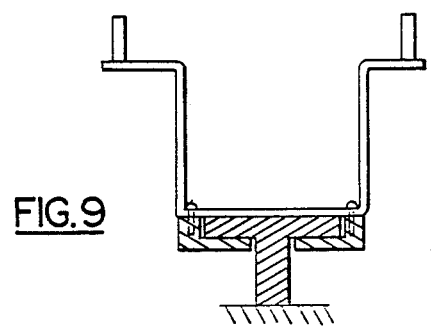
FIG. 9 is a cross section taken on line 9—9 of FIG. 2.

Mounted in the frame above the battery pack are the balance of the control sections, as may be seen in FIGS. 2 and 3. Mounted on the chassis 44 above the battery pack 32 are servo motors 68 and 70 and steering control board 67 for the articulation system of this device. Briefly, this consists of a pair of servo motors 68 and 70, each connected to one pair of actuation cables 69 and 71 to actuate the insertion tube in first and second planes of motion as is customary in devices of this type. Servos 68 and 70 are actuated through board 67 in accordance with the position of joystick 18 when actuated. As can be seen in FIGS. 2, 3 and 9, the servo control assembly for the articulation of the insertion tube includes a U-shaped metal bracket 74 slidably mounted on a T bar 72 of Teflon or similar material, which carries the two servo motors and control board 67. The plate 74 is held on T bar 72 by L-shaped bars 77 and connected to springs 76 which are connected at the other end to rod 75 which is fixed to the chassis 44 of the control module.

In operation, as the servo motors actuate the articulation section of the insertion tube, if excessive resistance is encountered as the insertion tube is bent at the distal end, causing excessive tension in the cables 69 and 71, the entire servo actuation section mounted on plate 74 will move along the track against the tension of springs 76 so as not to stretch the actuation cables 69 and 71. Also, if the insertion tube is tightly wound in coiled fashion for storage, instead of stretching the cables in the articulation section, the entire servo control assembly will be pulled forward against the springs 76, thus saving the actuation cables from stretching. Suitable tension control, centering, and stretch adjustment features, not shown, are incorporated in this servo controlled actuation system and are the subject of a separate application filed concurrently herewith and assigned to a common assignee of the present applicants.

Mounted to the right of the servo control motors for the articulation system is the light source for illuminating the object to be viewed. The lamp 22 may be one of several different types of standard light sources such as a halogen lamp or a metal hallide lamp. It is mounted in a socket 80 which, in turn, is fixed on a bracket or plate 82 slidably mounted on the Teflon bar 72 in a similar fashion to bracket 74. Bracket 82 is held in the "home" position by latch mechanism 84. To facilitate the removal and replacement of the lamp 22, a door 86 is provided which, when opened and latch 84 is lifted, allows the light socket and light on plate 82 to be moved outwardly so that the light can be simply and easily lifted up and out of the socket 80 for cleaning and/or replacement as required. Ejector lever 85 is provided to assist in lamp removal. The light output from the lamp 22 is picked up by funnel 88 also mounted on plate 82 and carried by the fiber optic cable 21 to the viewing head of the insertion tube and projected onto the object to be viewed.

Funnel 88 also carries an infra-red filter to remove most of the infra red in the light transmitted through the insertion tube. The image sensor being based on a silicon chip is sensitive to infra-red radiation and to prevent damage to the chip, this protection is included.

Fiber optic cable 21 comprises one or more layers of optical fibers disposed about the circumference of the insertion tube 12 to obtain more fibers for additional light transmission without unduly enlarging the diameter of the tube 12. This combination of additional optical fibers and low wattage lamp still allows sufficient illumination of the object being viewed. The lamp 22, in one embodiment, is a standard seventy-five watt halogen lamp drawing approximately eight amps at twelve volts. A fan 87 is provided in one side of housing 30 which draws in air from louver 31 over the various circuit boards, power supply, and lamp 22 to cool them and exhausts air out the side of housing 30.

The control system for modulating the light output in accordance with the requirements of the video pickup system is also the subject of a separate application assigned to a common assignee of the present application and generally involves very rapidly turning the light on and off in accordance with the video signal fed back from the video processor and the image pickup sensor. One side of the lamp 22 is connected directly to the twelve volt output of the power supply closely adjacent to the lamp and shielded by conductive shield 89 to minimize any noise created by the rapid pulsing of the lamp power supply voltage. Since this is a twelve volt seventy-five watt lamp, the current nominally is about eight amps at maximum and pulsing it at video frequencies creates very large noise components which must be properly shielded and accounted for.

Figure 5:
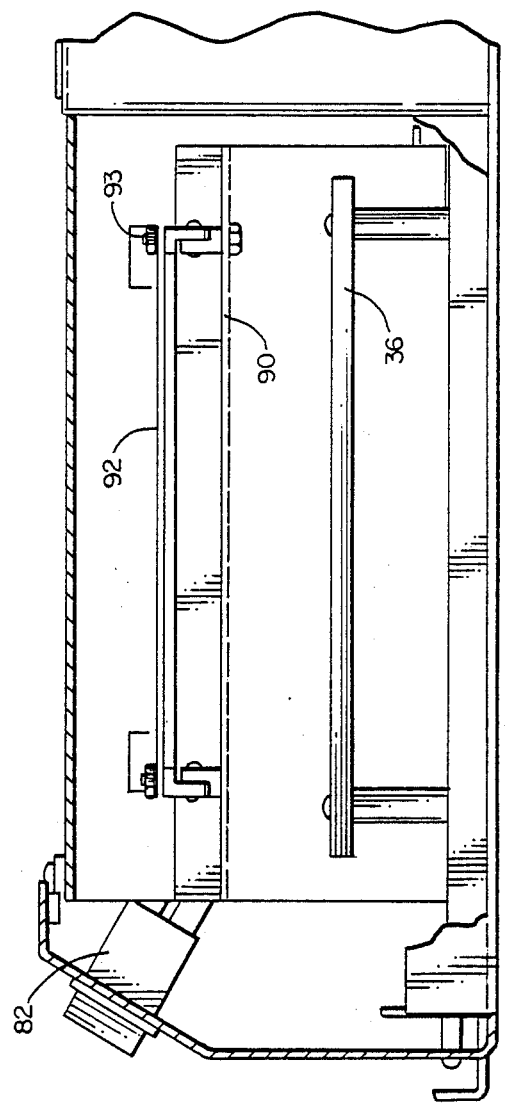
FIG. 5 is a partial sectional view, partly broken away, showing mounting of various processor boards for the system, together with their electrical and physical shielding.

Mounted in the lower left-hand corner of FIGS. 3 and 5 are a pair of boards, one—the DC-to-DC converter board and the other the video processor board. The DC-to-DC converter board 36 takes the twelve volt output from the power supply 31 and/or battery pack 32 and converts it to all the various voltages required for operating the video processor 26, steering control 16, light dimmer 24 and the other control functions of the device. These voltages include not only $+12$ from the power supply, but a $-12$, $+5$, $+8.5$, $+15$ and various other voltages as required. This DC-to-DC converter 36 is mounted below a conductive shield 90 to prevent stray radiations from these conversion functions being radiated into the rest of the processing control circuits of the system.

Above this conductive shield is the video processor 26 which is a multi-layer board 92, including all the necessary processing circuits for taking the video output of the full color chip in the image sensor 28 and converting it to the proper NTSC video format to drive the portable color television display in display 40 shown in FIG. 1. This board 92 also develops from the chip, a feedback signal for the lamp dimmer control 24 for use in setting the light output from lamp 22.

The video processor 26 also includes a dip switch section that adjusts the timing of the circuit to allow different length insertion tubes to be used without having to provide a separate video processor board for each probe.

By selectively actuating one of several dip switches on the board 92, the delay encountered in longer or shorter insertion tubes can be accommodated. As may be seen in FIGS. 2, 3, and 5, the steering control board 67 and the video processor board 92 are hingedly mounted to the frame at 91 and 93 respectively, so they can be pivoted up out of the way to allow access to the components therebelow for adjustment and repair.

In operation, the system is turned on by positioning ON-OFF switch 80 in the "ON" position, and the lights are turned on by CHARGE-LAMP switch 82 being positioned in the "LAMP" position. The portable battery operated display unit, which has its own battery, is turned on and the system is then ready for operation. The insertion tube may then be guided into the cavity to be inspected by using the joystick 18 to articulate the end thereof as it is fed into the cavity to reach the desired inspection site. Joystick 18 is a standard commercial unit, that by up and down and left and right movement, actuates potentiometers to change the voltage developed across these resistors which is then applied to the steering control 16 which utilizes the information to tell the servo motors how far to rotate in the two different planes to actuate the insertion tube. Each servo motor 68 and 70 has mounted on it a wire moving quadrant 96 to which are attached the pair of wires 69 and 71 for the particular direction of actuation that the servo controls. As these quadrants 96 are rotated, one wire is put in tension, and the other is relaxed to allow the insertion tube to bend in the appropriate direction. The other servo controls movement in a direction at ninety degrees to the first so that by properly controlling both servos from the joystick, the insertion tube may be bent to any desired position. The spring loaded mounting as described herein protects the wires from any overstretching and, in addition, safety controls are provided within the steering control circuitry for limiting the amount of rotation of the servo control motors and the centering and balancing of the two planes of motion, all as shown in detail in the aforesaid application.

Initially, as the insertion tube is being fed into the cavity to be inspected, the image being picked up by the solid state full color sensor will generally be relatively dim because the image being viewed will be at a considerable distance from the sensor in the viewing head. As the viewing head approaches the image to be viewed, the distance between the head and the object decreases and the light intensity, particularly the whites, begins to increase to the point that blooming of the image on the video display would occur. As this video signal from the sensor increases, it is fed back to the light dimmer control circuitry to cause the light to be turned off for a greater percentage of the pulse cycle and thus to reduce the illumination of the object and to prevent blooming, loss of definition, and resolving power on the video display. Again, this is described in full detail in the above identified co-pending application.

Since the lamp 22 is not under full power continuously and since most of the image viewing is done at fairly close range, on the order of an inch or two, the lamp 22 duty cycle is considerably reduced, and therefore, the power consumption is greatly reduced. In one embodiment of this invention, it has been found that the seventy-five watt lamp which is operated at significantly less than its full power output continuously allows the entire apparatus to be run from the battery pack for a period of approximately one hour. This time can be extended if very close inspection is being done most of the operating cycle, and it will be reduced somewhat if a lot of long range viewing is being done during the operating cycle.

In one preferred embodiment, according to the present invention, the borescope/endoscope system has been reduced to two small packages—one, the commercial color television display package, and the second, all the rest of the borescope system except for the insertion tube and the joystick. This package including the processing, and control module is approximately six inches top to bottom, including the battery pack, nine and one-half inches side to side, and fifteen inches front to back, and weighs a total of twenty-five pounds. The color monitor is approximately nine inches wide, five-and-one-half inches high, and thirteen-and-one-half inches deep and weighs fourteen pounds with the battery pack. The insertion tube designed to operate with this system is approximately fifteen feet long and has a diameter of about eight to ten millimeters, depending on the particular configuration desired for the object to be viewed. The entire system may thus be very easily carried by one person through manholes or other restricted entrances to industrial apparatus and can be operated without access to commercial power for approximately one hour. This is to be contrasted with prior art devices which have comprised, in many cases, a television monitor, a video processor module, a probe control module, a separate light power and control package, and the probe unit itself, each unit being roughly the size of the entire unit according to the present invention. The prior art devices have also required a power cord plugged into a commercial one-hundred-ten volt sixty hertz power source.

We have thus provided a very compact, portable, highly efficient borescope/endoscope system for full color viewing of an object in a remote cavity.

While the invention has been explained with reference to the structure disclosed herein, it is not confined to the details as set forth, and this application is intended to cover modifications and changes as may come within the scope of the following claims.

What is claimed is:

1. A portable steerable borescope or endoscope of the type having, a viewing head, an insertion tube with a cable bendable steering section proximally of the viewing head, at least one pair of steering cables, a fiber optic object illumination channel connected to said viewing head, and an object image channel connected to said viewing head, which comprises;
    an image sensor in said viewing head;
    servo motor operatively connected to each pair of steering cables in said bendable steering section;
    servo control means connected to said servo motor for operating said servo motor,
    remote actuator means operatively connected to said servo control means to permit an operator to manipulate said steering section by controlling the rotation of said servo motors;
    lamp means positioned to illuminate the object through said fiber optic illumination channel;
    video processor means for transforming the object image from said image channel into NTSC format for display;
    lamp dimmer means connected to said lamp means and said video processor means for controlling the light output of said lamp means in accordance with the video signal from said image sensor to provide optimum video image brightness;
    video display means connected to the output of said video processor, via an extended flexible cable for locating said display means remotely from said servo, lamp and video processor means, and
    power supply means including a battery pack and means for selectively converting commercial alternating current power to direct current power for charging the battery pack and operating the borescope/endoscope.

2. A portable steerable borescope as described in claim 1 wherein said power supply means includes said battery pack being interchangeable with other similar battery packs; an external twelve volt connection for selectively accessing an external battery source; an external one-hundred-ten/two-hundred twenty volt connection for accessing commercial power; rectifier means for converting said one-hundred-ten/two-hundred-twenty volt AC to twelve volt DC; and DC-to-DC converting means for changing the twelve volt DC voltage into a plurality of other DC voltages required to operate the device.

3. A portable steerable borescope as described in claim 2 wherein said battery pack comprises four six-volt batteries connected in a series parallel circuit to form a twelve volt output and said batteries are sealed in a plastic container with a banana plug type receptacle positioned in a recess at one end.

4. A device as described in claim 1 wherein said image sensor is a full color solid state image sensor mounted in the viewing head of said insertion tube.

5. A device as described in claim 4 in which said solid state image sensor is a CCD chip having 248,000 pixel full color capability.

6. A device as described in claim 1 in which said video display means is a full color portable five inch diagonal diameter JVC color monitor.

7. A device as described in claim 1 wherein the actuator means comprises a joystick control, including a pair of variable resistors, one being actuated by movement of the joystick in the plus or minus X direction, and one being actuated by movement of the joystick in the plus or minus Y direction.

8. A device as described in claim 1 wherein said lamp means comprises a 75 watt halogen lamp.

9. A device as described in claim 1 wherein said lamp dimmer means comprises, circuit means for turning off said lamp to reduce the illuminating power required to the minimum amount to illuminate the object as determined by the video signal from the image sensor device in the viewing head.

10. The device of claim 1 wherein said cable bendable steering section of the insertion tube includes two pair of control cables each having a servo motor operatively connected thereto and to said servo control means whereby said bendable insertion tube can be actuated in full three dimensional fashion.

11. A device as described in claim 10 wherein said servo control means includes cable tension relieving means for preventing stretching of the actuation cables in the cable bendable steering section of the insertion tube.

12. A portable steerable borescope or endoscope of the type having, a viewing head, an insertion tube with a cable bendable steering section proximally of the viewing head, at least one pair of steering cables, a fiber optic object illumination channel connected to said viewing head, an image sensor in said viewing head, and an object image channel connected to said viewing head, which comprises;
  a pair of servo motors each operatively connected to a pair of steering cables extending to said bendable section;
  steering control circuit means for controlling the rotation of said servo motors;
  lamp means positioned to illuminate the object to be viewed via said fiber optic illumination channel,
  video processor means for transforming the object image from said image channel into format for video display,
  lamp dimmer means connected to said lamp and said video processor for controlling the light output of said lamp in accordance with the video signal from said image sensor to provide optimum video image brightness,
  DC-to-DC converter means for changing twelve volts DC to all the voltages required to operate the borescope;
  twelve volt DC battery means connected to said DC-to-DC converter means;
  all of the foregoing means and apparatus being contained in a single control module box;
  separate video display means operatively connected to said control module box; and
  separate actuator means for said steering control circuit operatively connected to said control module by a flexible cable.

13. A device as described in claim 12 wherein said video processor includes dip switch means for adjusting the signal delay to match the length of the insertion tube.

14. In a portable borescope of the type having an insertion tube with a cable steerable section adjacent the viewing head, the combination comprising:
  a first housing member having mounted therein:
    a plurality of servo motors operatively connected to said cable steerable section;
    a servo operating circuit control board for driving said servo motors,
    lamp means positioned to transmit through a fiber optic cable light to illuminate the object to be viewed;
    video processor means for transforming object images received from the viewing head into standard NTSC format;
    lamp dimmer means connected to said lamp and said video processor means for controlling the light output of said lamp in accordance with the video signal from said viewing head to provide optimum video image brightness;
    power supply means including a battery pack and means for selectively converting commercial alternating current power to direct current power for charging the battery pack and/or operating the borescope/endoscope;
  a second housing member having mounted therein a standard five inch color video monitor;
  an actuator for providing electrical signals to said control board to cause said servo motors to move said steerable section proportional to the position of said actuator; and
  an insertion tube having a viewing head including an image sensor, a plurality of steering cables attached to said steerable section, a fiber optic illuminating cable, and a video cable, all operatively connected to said viewing head;
  so that a compact, fully portable borescope for inspection of objects in inaccessible cavities at remote sites is provided.

15. A device as described in claim 14 further defined by a dual male banana plug mounted in a bracket on said first housing member for limited 360° movement in a direction at right angles to the axis thereof of each male member, and a pair of female banana plug receptacles mounted in a recess in one end of said battery pack means adapted to receive said male banana plugs when said battery pack is installed in said first housing member.

16. In a portable borescope of the type having an insertion tube with a cable steerable section adjacent the viewing head, the combination comprising:
  a first housing member having mounted therein:
    a plurality of servo motors operatively connected to said cable steerable section;
    a servo operating circuit control board for driving said servo motors,
    lamp means positioned to transmit through a fiber optic cable light to illuminate the object to be viewed;
    video processor means for transforming object images received from the viewing head into standard NTSC format;
    lamp dimmer means connected to said lamp and said video processor means for controlling the light output of said lamp to provide optimum video image brightness;
    power supply means including a battery pack and means for selectively converting commercial alternating current power to direct current power for charging the battery pack and/or operating the borescope/endoscope;

a second housing member having mounted therein a standard five inch color video monitor;

an actuator for providing electrical signals to said control board to cause said servo motors to move said steerable section proportional to the position of said actuator; and an insertion tube having a full color multi-pixel chip mounted in a socket receptacle positioned in the distal end of said viewing head, a plurality of steering cables attached to said steering section, a fiber optic illuminating cable, a video cable, all operatively connected to said viewing head;

so that a compact, fully portable borescope for inspection of objects in inaccessible cavities at remote sites is provided.

* * * * *